(12) United States Patent
Righi et al.

(10) Patent No.: US 7,886,137 B1
(45) Date of Patent: Feb. 8, 2011

(54) TEMPLATE-BASED BIOS PROJECT CREATION

(75) Inventors: Stefano Righi, Lawrenceville, GA (US); Paul Anthony Rhea, Lawrnceville, GA (US)

(73) Assignee: American Megatrends, Inc., Norcross, GA (US)

( * ) Notice: Subject to any disclaimer, the term of this patent is extended or adjusted under 35 U.S.C. 154(b) by 943 days.

(21) Appl. No.: 11/679,428

(22) Filed: Feb. 27, 2007

(51) Int. Cl.
*G06F 9/00* (2006.01)
*G06F 15/177* (2006.01)
(52) U.S. Cl. ......................................................... 713/1
(58) Field of Classification Search ....................... 713/1
See application file for complete search history.

(56) References Cited

U.S. PATENT DOCUMENTS

| | | | |
|---|---|---|---|
| 6,513,159 B1 * | 1/2003 | Dodson | 717/178 |
| 7,007,158 B1 * | 2/2006 | Mahmoud | 713/1 |
| 7,197,743 B2 * | 3/2007 | Borg et al. | 717/120 |
| 7,447,889 B2 * | 11/2008 | Cartes et al. | 713/1 |
| 2006/0184794 A1 * | 8/2006 | Desselle et al. | 713/166 |

* cited by examiner

*Primary Examiner*—Thomas Lee
*Assistant Examiner*—Eric Chang
(74) *Attorney, Agent, or Firm*—Hope Baldauff Hartman, LLC

(57) ABSTRACT

Methods and computer-readable media provide for the creation of a basic input/output system (BIOS) project. Embodiments include a project creation wizard that guides a user through the project creation process. The project creation wizard utilizes a script file that includes entries corresponding to each category of BIOS component that should be included within a given project. Upon receiving a project type indicator from the user, the project creation wizard locates a corresponding script file and parses through each entry of the script file, systematically utilizing the corresponding information to search for applicable BIOS components and to allow or reject user selections of the located BIOS components according to the data within the script file entry. The BIOS components that are selected according to the script file data are copied to a designated location to create a BIOS project file.

18 Claims, 12 Drawing Sheets

```
                                                                      ┌─114
                                                                    ⤹

<?xml version="1.0" encoding="unicode" ?>
202─┐
    ⤵ - <NEW_PROJECT_WIZARD VERSION="1.1" DESCRIPTION="New Aptio 3 Project
          Wizard Script File">

- <ADD_COMPONENTS>
                             ┌─206              ┌─208
204A─▶ <COMPONENT CATEGORY="eCore" DESCRIPTION="Core components"
           LOCATION_IN_PROJECT="CORE" MANDATORY="true" UNICITY="false" />
                    └─210      212─┘                        └─214

204B─▶ <COMPONENT CATEGORY="eChipset" DESCRIPTION="Chipset components"
           LOCATION_IN_PROJECT="CSP" MANDATORY="true" UNICITY="false" />

<COMPONENT CATEGORY="eBoard" DESCRIPTION="Board components"
204C─▶    LOCATION_IN_PROJECT="BSP" MANDATORY="true" UNICITY="false" />

<COMPONENT CATEGORY="IO" DESCRIPTION="IO components"
204D─▶   LOCATION_IN_PROJECT="BSP\IO" MANDATORY="false" UNICITY="false" />

<COMPONENT CATEGORY="FLASH" DESCRIPTION="Flash components"
204E─▶   LOCATION_IN_PROJECT="BSP\FLASH" MANDATORY="true" UNICITY="false" />

<COMPONENT CATEGORY="CPU" DESCRIPTION="CPU components"
204F─▶   LOCATION_IN_PROJECT="CPU" MANDATORY="true" UNICITY="false" />

</ADD_COMPONENTS>

</NEW_PROJECT_WIZARD>
```

*Fig.2.*

TEMPLATE-BASED BIOS PROJECT CREATION

BACKGROUND

Many computers utilize a basic input/output system (BIOS) when powering on in order to prepare the computer to recognize and control various computing devices within the computer or connected to the computer. A BIOS typically includes code embedded on a chip within the computer. This code may include various components, or independent pieces of code that provides some specific functionality within the BIOS. For example, a BIOS may include a component that provides support for a specific processor created by a specific manufacturer. Because of the virtually endless computer hardware configurations and manufacturers, a BIOS must be customized for each computer or for each varying computer configuration.

A BIOS project is a BIOS implementation that is tailored to a particular motherboard or hardware and/or software within a computer. A BIOS project includes a number of various components. The number and types of components included with any given BIOS project depend on the various computing elements within the target computer. Typically, when building a new BIOS project for a specific computer configuration, a BIOS designer must include all of the potential components that a customer, such as an original equipment manufacturer (OEM), might require for the target hardware configuration. In some instances, certain components are required, while in other instances, the same components are not required. In some instances, multiple components sharing a similar categorization may be included in the BIOS project, while in other instances, only a single component of a given category may be included. These determinations must be made by the BIOS designer for each BIOS project and then the corresponding components must be located, retrieved, and properly configured within the BIOS project. Doing so is often time consuming and prone to errors.

It is with respect to these considerations and others that the disclosure made herein is provided.

SUMMARY

Methods and computer-readable media are provided herein for creating a BIOS project using a script file. According to one implementation described herein, a method includes receiving a BIOS project type. A script file is used to identify a BIOS component category corresponding to the BIOS project type. A search is conducted for all BIOS components corresponding to the BIOS component category. Any BIOS components that are located are presented to a user for selection to be included within a BIOS project file. A selection of BIOS components to be included within the BIOS project file is received and a determination is then made as to whether the selection is valid. This determination is made using component category selection criteria that is stored within the script file. If it is determined that the selection is not valid, then an alternative selection of BIOS components that satisfies the component category selection criteria is requested. If it is determined that the selection is valid, then the BIOS project file is created with the selected BIOS components.

According to various aspects, the component category selection criteria includes an indicator as to whether a BIOS component from a particular component category is required to be included in the BIOS project file according to the BIOS project type. Additionally, the component category selection criteria may include an indicator as to whether more than one BIOS component from a particular component category may be included within the BIOS project file according to the BIOS project type. Consequently, according to implementations presented herein, upon selecting a BIOS project type, a user is presented with the appropriate potential BIOS components for inclusion in the BIOS project file. The user may select the desired BIOS components for the BIOS project file, and if the selection satisfies the component category selection criteria, the corresponding BIOS project file is created.

The above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 is an extensible markup language (XML) diagram showing the contents of an illustrative script file according to one embodiment presented herein;

DETAILED DESCRIPTION

Figure 1:
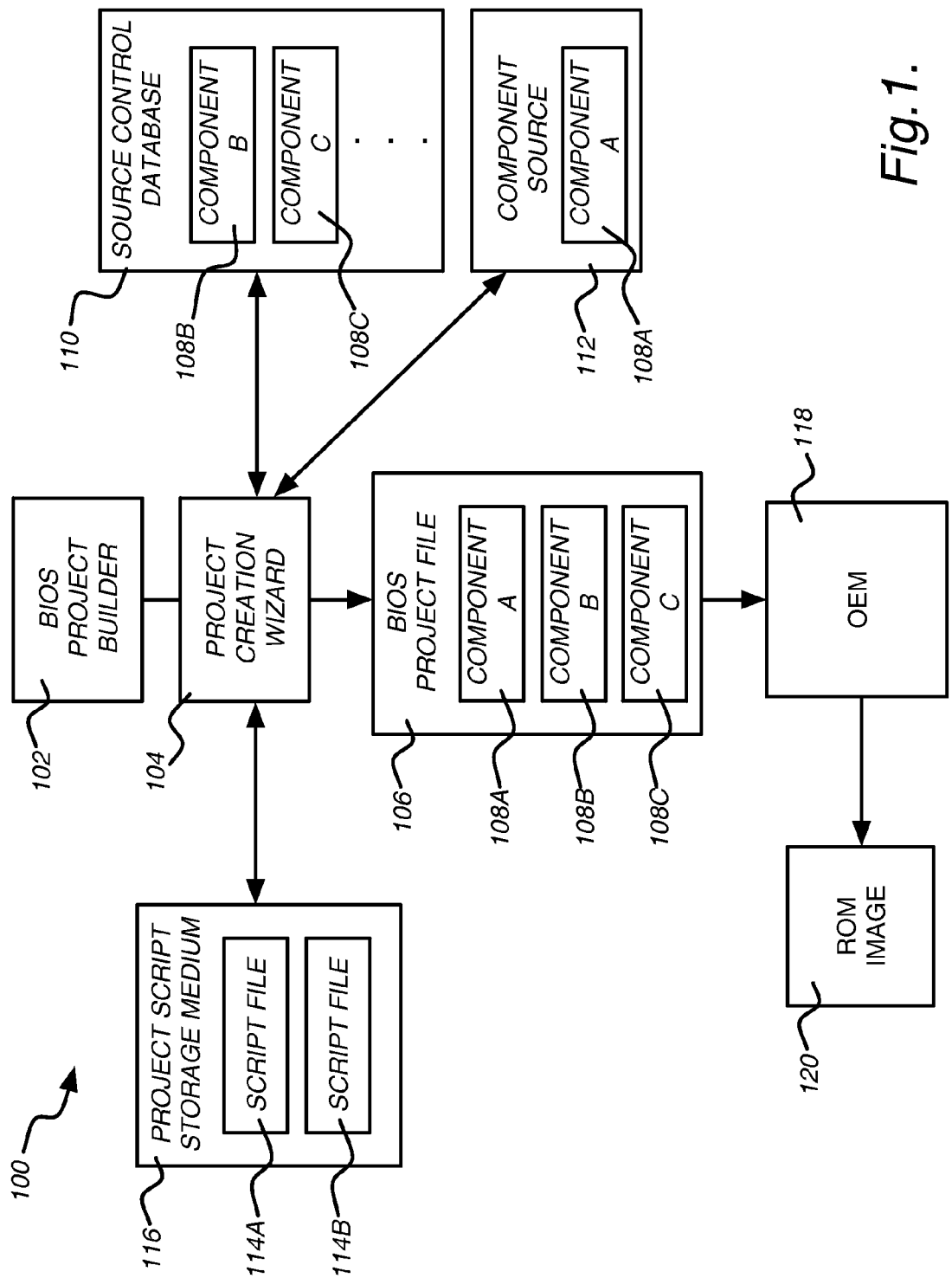
FIG. 1 is a block diagram showing an illustrative operating environment for the processes and computer systems described herein, and several of the software components utilized by the computer systems described herein.

The following detailed description is directed to systems, methods, and computer-readable media for creating a BIOS project using a project creation wizard and a script file. While the subject matter described herein is presented in the general context of program modules that execute in conjunction with the execution of an operating system and application programs on a computer system, those skilled in the art will recognize that other implementations may be performed in combination with other types of program modules.

Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

The subject matter described herein may be practiced in a distributed computing environment where tasks are performed by remote processing devices that are linked through a communications network and wherein program modules may be located in both local and remote memory storage devices. It should be appreciated, however, that the implementations described herein may also be utilized in conjunction with stand-alone computer systems and other types of computing devices. It should also be appreciated that the embodiments presented herein may be utilized with any type of local area network (LAN) or wide area network (WAN).

As stated briefly above, a BIOS project is a BIOS implementation that is tailored to a particular motherboard or hardware and/or software within a computer system. A BIOS project is made up of a number of BIOS components. As used throughout this disclosure, a BIOS component is an independent module of computer code that provides some specific functionality within the BIOS project. A BIOS component may be or may be related to one or more additional BIOS sub-components or parts. The implementations presented herein assume that the BIOS components to be included within a BIOS project file have already been created and reside in one or more storage locations. It should be appreciated that a user of a project creation wizard as described below may pause at any point during the creation of a BIOS project to create a desired BIOS component that does not yet exist. Implementations for creating BIOS components are disclosed in U.S. patent application Ser. No. 11/678,162 entitled, "Template-Based BIOS Component Creation," filed on Feb. 23, 2007, which is incorporated herein by reference in its entirety.

According to various implementations described herein, a user is provided with a method for creating a BIOS project in a manner that facilitates the BIOS component selection process. Embodiments include a project creation wizard that guides a user through the project creation process. The project creation wizard utilizes a script file that includes component category information that is used by the project creation wizard in searching for applicable BIOS components for each type of BIOS project and in guiding a user through the selection of applicable BIOS components for a specific BIOS project being built. Utilizing the implementations provided herein, a user of the project creation wizard and script file will be able to build a BIOS project efficiently and error-free.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for providing a BIOS project using a template-based script file will be described. FIG. 1 shows a project creation system 100 according to one embodiment described herein. The elements of the project creation system 100 and their respective functions will be discussed briefly with respect to FIG. 1 and then in greater detail below with respect to FIGS. 2-4E. The project creation system 100 includes a BIOS project builder 102 and a project creation wizard 104. The BIOS project builder 102 may be an application that assists a user in creating a BIOS project. According to one embodiment, the BIOS project builder 102 is VISUAL EBIOS (VEB) from AMERICAN MEGATRENDS, INC. of Norcross, Ga. VEB is project management software that provides a graphical software environment to assist in firmware development.

It should be appreciated that the BIOS project builder 102 and the project creation wizard 104 may be a single application, or the project creation wizard 104 may be a separate application initiated by the BIOS project builder 102 for creation of BIOS projects. The project creation wizard 104 provides a graphical user interface (GUI) to receive input from a user selecting BIOS components 108A-108C for inclusion within a BIOS project file 106. A sample GUI will be shown and described below with respect to FIGS. 3A-3D. The BIOS project file 106 includes all of the BIOS components 108A-108C that could be included in a BIOS for a particular computer hardware configuration. When the BIOS project file 106 is delivered to an OEM 118, the OEM 118 may select the final BIOS component configuration out of the BIOS components 108A-108C and create the read-only memory (ROM) image 120 that will provide support for various computer hardware devices. It should be understood that three BIOS components 108A-108C are shown for illustrative purposes only. A BIOS project file 106 may include any number of BIOS components 108 depending upon the desired configuration of the corresponding BIOS project.

In order to create the BIOS project file 106, the project creation wizard 104 must search for and retrieve the appropriate BIOS components 108A-108C. The BIOS components 108 may be located in any type of component source 112. The component source 112 may be a local or remote hard drive or any type of portable storage medium. According to various embodiments, a source control database 110, alone or in conjunction with another component source 112, stores the components 108A-108C to be copied into the BIOS project file 106. The source control database 110 may be one or more central component depositories where BIOS components 108 are stored for use in any number and type of BIOS projects.

The project creation wizard 104 utilizes a script file 114 to determine which BIOS components should be included within a particular BIOS project. Each type of BIOS project has a corresponding script file 114. Each script file 114 provides instructions for the project creation wizard 104 as to which BIOS components 108A-108C to search for and retrieve for a corresponding BIOS project file 106. The script files 114 additionally provide component category selection criteria utilized by the project creation wizard 104 in guiding a user through the selection process of BIOS components 108A-108C for a corresponding type of BIOS project. The script file 114 will be described in greater detail below with respect to FIG. 2.

Two script files 114A and 114B corresponding to two different BIOS project types are shown in FIG. 1 as being stored within a project script storage medium 116. For example, the script file 114A may correspond to an APTIO3 BIOS project while the script file 114B may correspond to an APTIO4 BIOS project. It should be appreciated that the project script storage medium 116 may be any type of storage media, including but not limited to magnetic storage media, optical storage media, and all types of memory cards and other portable storage media. It should also be appreciated that while two script files 114A and 114B are shown, any number of script files 114 may be included within the project script storage medium 116 corresponding to any number of BIOS project types.

Turning now to FIG. 2, the contents of an illustrative script file 114 will be described. Although the script file 114 is coded in XML, it should be appreciated by those with skill in the art that any other suitable software coding language may be used. The script file 114 includes a header 202 that provides a project description and version identifier. As stated above, each type of BIOS project will have a corresponding script file 114. The script file 114 additionally includes a number of component category entries 204A-204F. Each component category entry 204A-204F corresponds to a category of BIOS component 108. BIOS components 108A-108C may be categorized in various ways. For example, BIOS components 108A-108C may be categorized according to their physical or logical existence or according to their functionality. On the physical level, BIOS components 108A-108C may be categorized as central processing unit (CPU), chipset, flash, and input/output (IO) components. On the logical level, BIOS components 108A-108C may be categorized as core modules, which are generic from one BIOS project to the next, or various other modules that are related to a particular function.

According to one embodiment, the project creation wizard 104 recognizes nine potential component categories 114, including: eCore, IO, Flash, CPU, eChipset, eModule, ModulePart, eBoard, and Flavor. The eCore category includes core binaries and source files. The IO, Flash, and CPU categories include all initialization and programming necessary to support super IO, flash, and CPU elements, respectively. The eChipset category includes code that supports chipsets such as the North Bridge and South Bridge. The eModule category adds additional functionality to the core BIOS. There may be numerous eModules providing various functionalities. Depending on the functionality, eModules may have core, chipset, and/or OEM parts. Some components may include various categories of files within a single component. For example, a component may include generic files, chipset specific files, and board specific files. All of these files are included in the ModulePart category. The eBoard category includes code for supporting a particular motherboard. A Flavor component contains a list of anything that has changed for a specific project. So, the Flavor component for a given project may include files from components in every other component category. It should be appreciated that any quantity and type of component categories may be utilized within the scope of the disclosure presented herein.

Each component category entry 204A-204F of the script file 114 includes various information that will be used by the project creation wizard 104 to search for BIOS components 108A-108C and to guide users through the BIOS component selection process. Looking at the component category entry 204A, a component category identifier 206 instructs the project creation wizard 104 to search for all BIOS components 108A-108C having a matching component category. For example, the component category entry 204A instructs the project creation wizard 104 to search for all BIOS components 108A-108C that are categorized as "eCore" components. A component category description 208 describes the category and will be displayed for the user when selecting BIOS components 108A-108C from the corresponding category. The directory location 210 instructs the project creation wizard 104 as to the location within the BIOS project file 106 in which the BIOS components 108A-108C that are selected by the user will be stored.

Each component category entry 204A-204F of the script file 114 additionally includes component category selection criteria that provides a set of BIOS component selection "rules" for the corresponding component category. According to one implementation, the component category selection criteria includes two indicators used by the project creation wizard 104 to guide the user in selecting BIOS components 108A-108C for the BIOS project file 106. The first indicator is a "mandatory" indicator 212. The "mandatory" indicator 212 includes a logical value that is set to "true" or "false" depending upon whether a BIOS component 108 from the corresponding component category 206 is required for the type of project being created. For example, because the "mandatory" indicator 212 of the component category entry 204 is set to "true," there must be an eCore BIOS component within an APTIO3 project.

The second indicator included within each component category entry 204A-204F is a "unicity" indicator 214. The "unicity" indicator 214 includes a logical value that is set to "true" or "false" depending upon whether more than one BIOS component 108 may be included within the type of project being created. For example, because the "unicity" indicator 214 of the component category entry 204 is set to "false," then more than one eCore BIOS component may be included within an APTIO3 project. Looking at one more example for clarity purposes, the component category entry 204B instructs the project creation wizard 104 to search for all BIOS components 108A-108C within the eChipset category. Because the "mandatory" indicator 212 is set to "true," the user will be forced to select at least one located BIOS component 108A-108C to be included within the BIOS project file 106. Because the "unicity" indicator 214 is set to "false," the user will be allowed to select more than one BIOS component 108A-108C to be included within the BIOS project file 106. It should be understood that each script file 114 may contain any number of component category entries 204A-204F depending on the categories of BIOS components 108A-108C that should be included in the corresponding type of BIOS project. It should also be understood that each component category entry 204A-204F may contain any quantity and type of information associated with the BIOS components 108A-108C of that category.

Figure 3A:
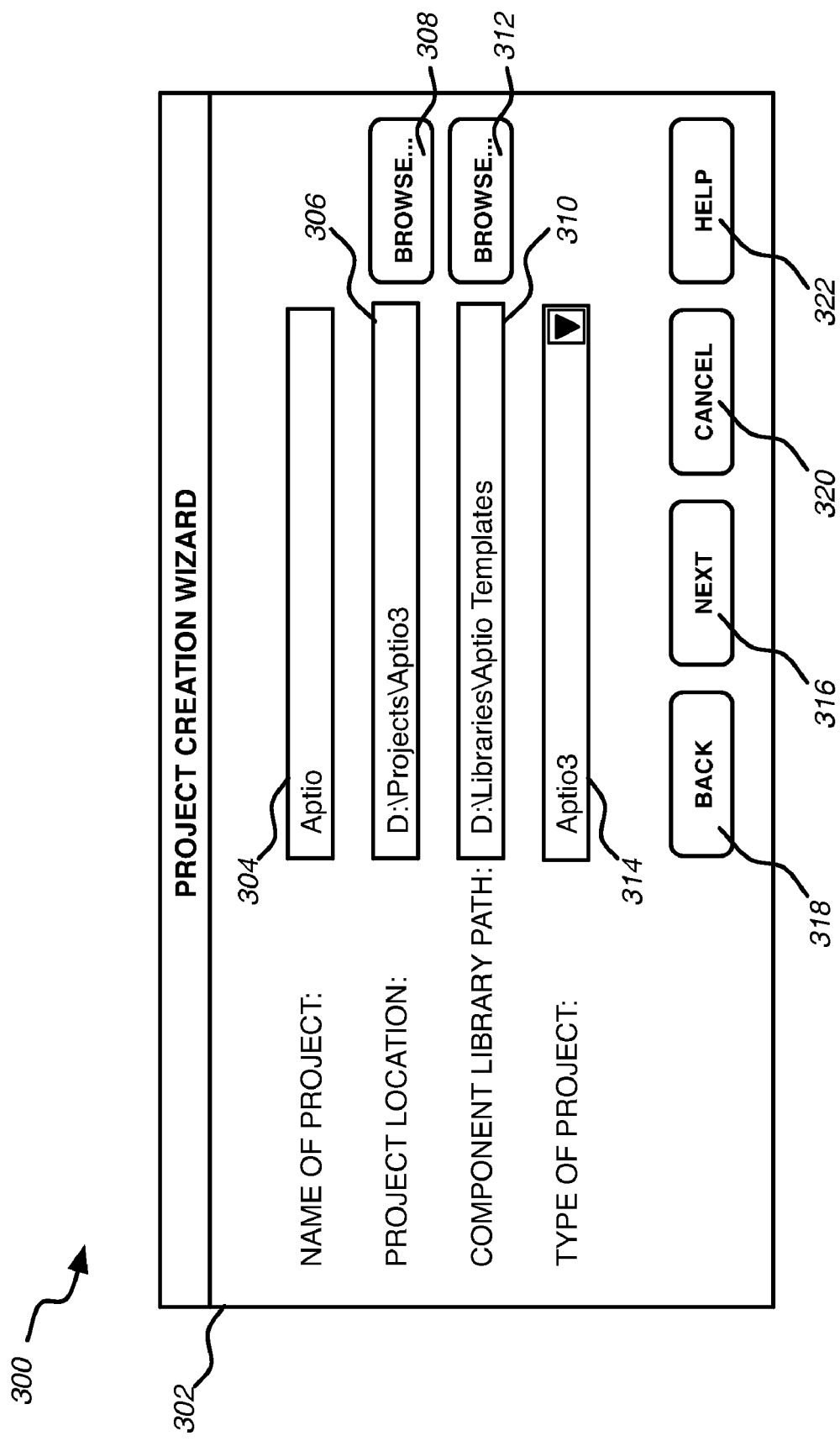
FIGS. 3A-3D are user interface diagrams showing illustrative project creation wizard user interfaces according to various embodiments presented herein.

FIG. 3A shows an example of a project creation wizard user interface 300 according to one implementation of the disclosure provided herein. A user that is creating a BIOS project would enter this user interface 300 as an early step in the process of creating a new BIOS project. The project creation wizard user interface 300 includes a series of dialog boxes that guide a user through the process of selecting BIOS components 108 for inclusion within a BIOS project file 106. After completing the selection process via the series of dialog boxes, the project creation wizard 104 will create the BIOS project file 106 that will ultimately be used to create the ROM image 120.

The project creation wizard 104 first displays a project definition dialog box 302. The user is prompted to enter a name for the project in the project name field 304. The user enters a project location path in the project location field 306. The project location path is the directory location in which the resulting BIOS project file 106 will be stored. The user may have the option of browsing for a project location path using the project location browse button 308. The user may enter a component source location in the component library path field 310. The project creation wizard 104 will search the component source location identified by the user for applicable BIOS components 108. The user has the option to enter the component source location in the component library path field 310 using an input device such as a keyboard, or the user may select the component source browse button 312 to browse for the desired component path.

The type of BIOS project that the user is attempting to create is selected in the project selection field 314 of the project definition dialog box 302. The project type may be selected via a drop-down menu having project types that are associated with the script files 114A and 114B. It should be appreciated that the user may additionally choose to create a new project type. A script file 114 may exist for a new project type that includes a component category entry 204 corresponding to each defined category of BIOS components 108. Each component category entry 204 would also have "mandatory" and "unicity" logical values set to "false" to allow the user to customize the new project type in a desired manner. When the user has completed the input fields 304, 306, 310, and 314 of the project definition dialog box 302, the user may proceed by selecting the "Next" button 316. Alternatively, the user may select the "Back" button 318 to return to a previous screen or to clear the current project creation wizard user interface 300, the "Cancel" button 320 to exit the project creation wizard 104, or the "Help" button 322 to receive assistance.

After the "Next" button 316 is selected, the project creation wizard 104 retrieves the script file 114 corresponding to the type of project selected in the project selection field 314. The project creation wizard 104 then searches for the first component category entry 204 of the script file 114. Using the component category identifier 206 of the first component category entry 204, the project creation wizard 104 searches the component source location that the user entered in the component library path field 310 for all BIOS components 108 that share the component category identifier 206. The project creation wizard 104 will then display the component selection dialog box 324 shown in FIG. 3B. The component category description 208 associated with the first component category entry 204 of the appropriate script file 114 is displayed in the component description field 326 of the component selection dialog box 324. A BIOS component identifier 330 stored with each BIOS component 108 that is located by the project creation wizard 104 during the component category search is displayed in a component selection window 328 of the component selection dialog box 324.

Figure 3B:
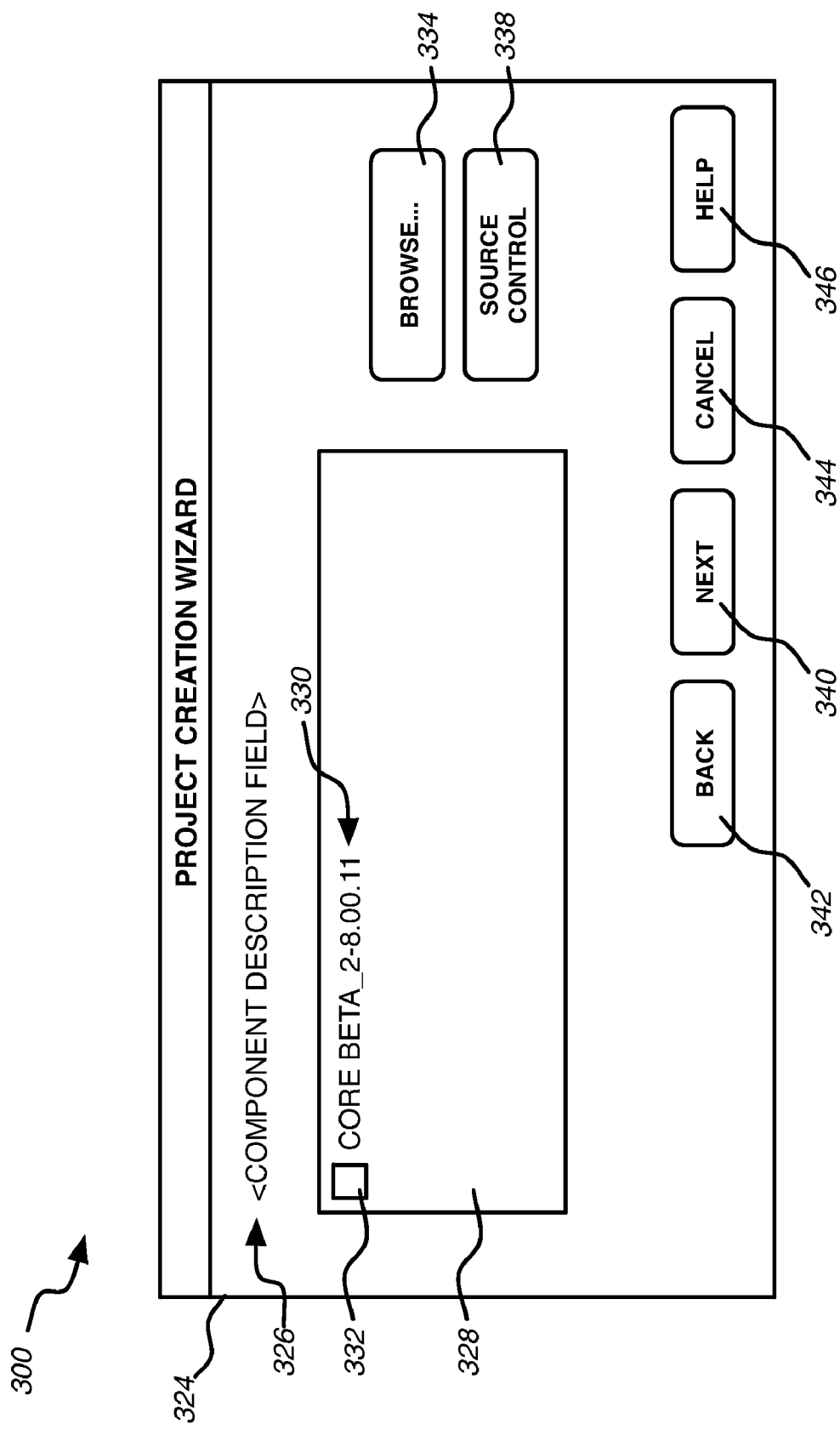

Using the examples shown in FIGS. 2, 3A, and 3B, upon the selection of the "Next" button 316 of the project definition dialog box 302, the project creation wizard 104 located a script file 114 associated with an APTIO3 project. The first component category entry 204A instructed the project creation wizard 104 to search for all eCore BIOS components 108. The project creation wizard 104 searched the path indicated in the component library path field 310 for all BIOS components 108 that are categorized as eCore components. The project creation wizard 104 located one BIOS component 108 identified as "CORE BETA_2-8.00.11," and displayed this BIOS component identifier 330 in the component selection window 328. The user may now select this BIOS component 108 for inclusion within the BIOS project file 106 by selecting the check box 332 associated with the BIOS component identifier 330. It should be noted that following this example, should the user select the "Next" button 340 without selecting the check box 332, the project creation wizard 104 would not allow the user to proceed past this component selection dialog box 324 since the "mandatory" logic value of the component category entry 204A is set to "true," which instructs the project creation wizard 104 that at least one BIOS component 108 from the eCore category must be included within the BIOS project file 106.

If no BIOS components 108 were located by the project creation wizard 104 during the associated search, or if the user would like to search an additional location prior to proceeding, then the user may select a new component source location using the component source browse button 334. Alternatively, the user may select the source control button 338 to instruct the project creation wizard 104 to conduct a search for all BIOS components 108 having the same component category within the source control database 110. As described above, the source control database 110 is a central repository for BIOS components 108. The source control database 110 may be a default search location if a component source location is not specified in the component library path field 310 of the project definition dialog box 302.

Once the user has selected all applicable BIOS components 108 listed in the component selection window 328, the user may proceed by selecting the "Next" button 340. Alternatively, the user may select the "Back" button 342 to return to a previous screen or to clear the current project creation wizard user interface 300, the "Cancel" button 344 to exit the project creation wizard 104, or the "Help" button 346 to receive assistance. Upon receiving an indication that the "Next" button 340 has been selected, the project creation wizard 104 will proceed to the next component category entry 204B of the script file 114 to determine the next component category identifier 206 for which the designated component source will be searched. Using the example shown in FIG. 2, the project creation wizard 104 would search for all eChipset BIOS components 108 at the designated component source. The process described above with respect to FIG. 3B is repeated for each component category entry 204A-204F until all BIOS components 108 corresponding to all of the component category entries 204A-204F within the appropriate script file 114 have been located.

Figure 3C:
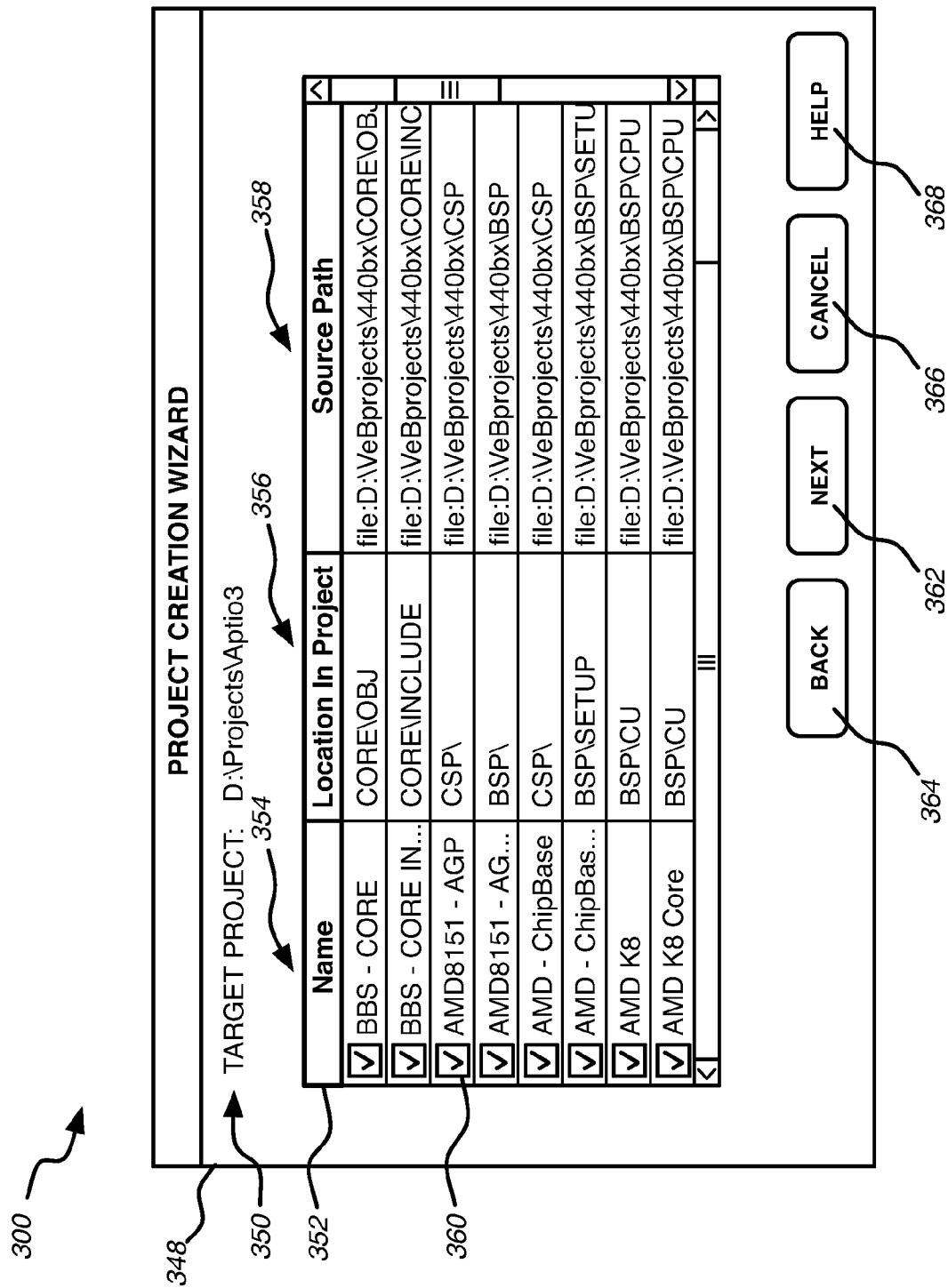

After all BIOS components 108 have been located and the desired BIOS components 108 have been selected for inclusion within the BIOS project file 106, then according to one embodiment, the project creation wizard 104 will display the project modification dialog box 348 shown in FIG. 3C. The project modification dialog box 348 allows the user to make any final changes in the configuration of the BIOS project file 106 before it is created. The project location path 350 from the project location field 306 of the project definition dialog box 302 is displayed for the user. A component summary window 360 displays information associated with all of the selected BIOS components 108, including but not limited to the component name 354, the component directory location 356 within the project, and the source path 358 from which the selected BIOS component 108 will be copied to the component directory location 356.

As stated above, the project modification dialog box 348 gives the user an opportunity to deselect any undesirable BIOS components 108 prior to creating the BIOS project file 106. The project modification dialog box 348 also provides the only time in which the user may remove parts of a complex component. A complex component is made up of various sub-components, or parts. A BIOS sub-component or part is a module of computer code that is dependent upon another BIOS component or sub-component to fully realize its functionality. A sub-component may not provide its intended functionality if the component to which it has a relationship with does not exist within the BIOS project. The project modification dialog box 348 will display the parts of a BIOS component 108, if any exist, allowing the user to remove these parts if they do not apply to the BIOS project being created. Once the user is satisfied with the BIOS components 108 being included in the desired BIOS project file 106, the "Next" button 362 may be selected. Alternatively, the user may select the "Back" button 364 to return to a previous screen or to clear the current project creation wizard user interface 300, the "Cancel" button 366 to exit the project creation wizard 104, or the "Help" button 368 to receive additional assistance.

Figure 3D:
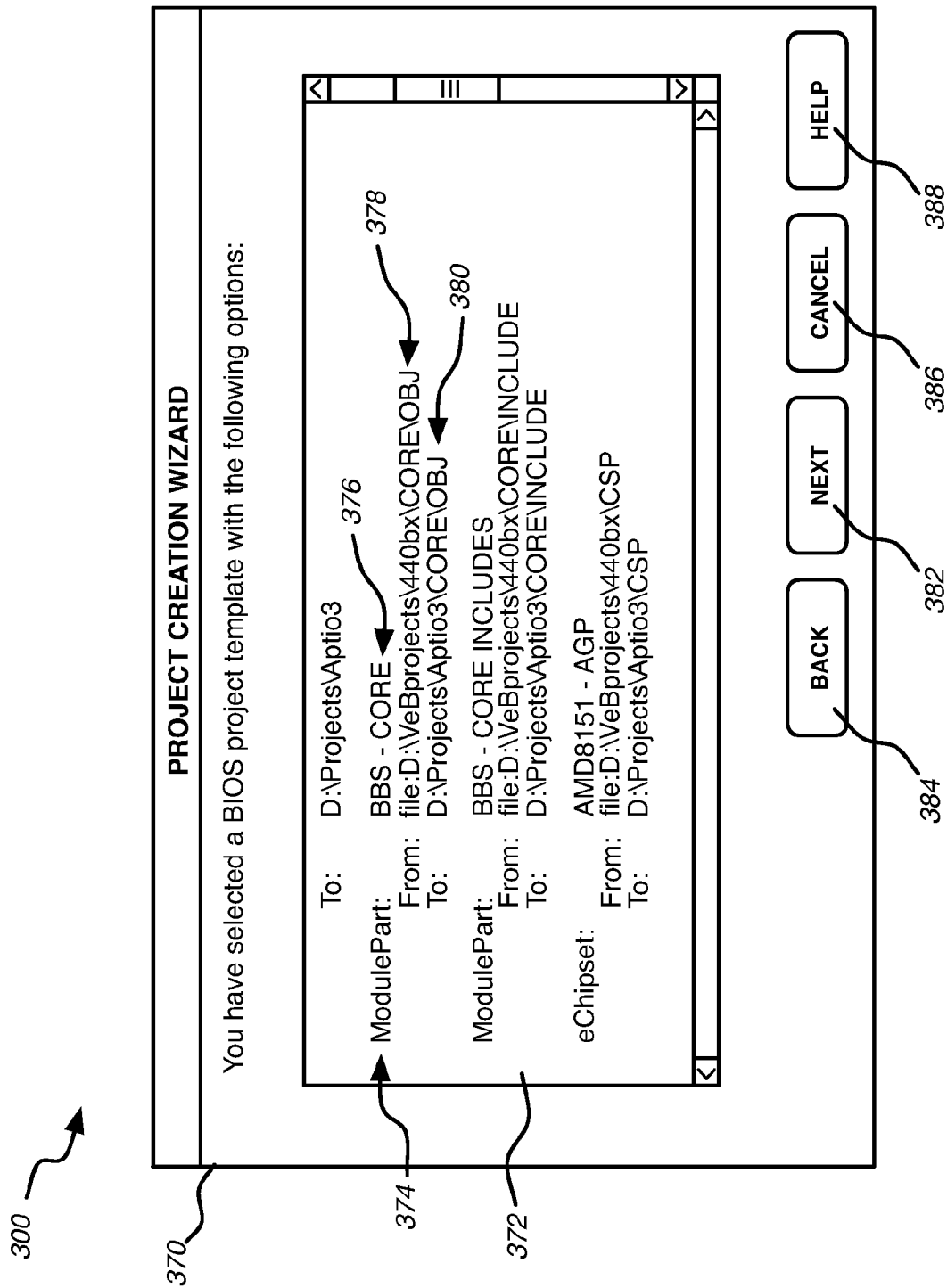
Figure 4A:
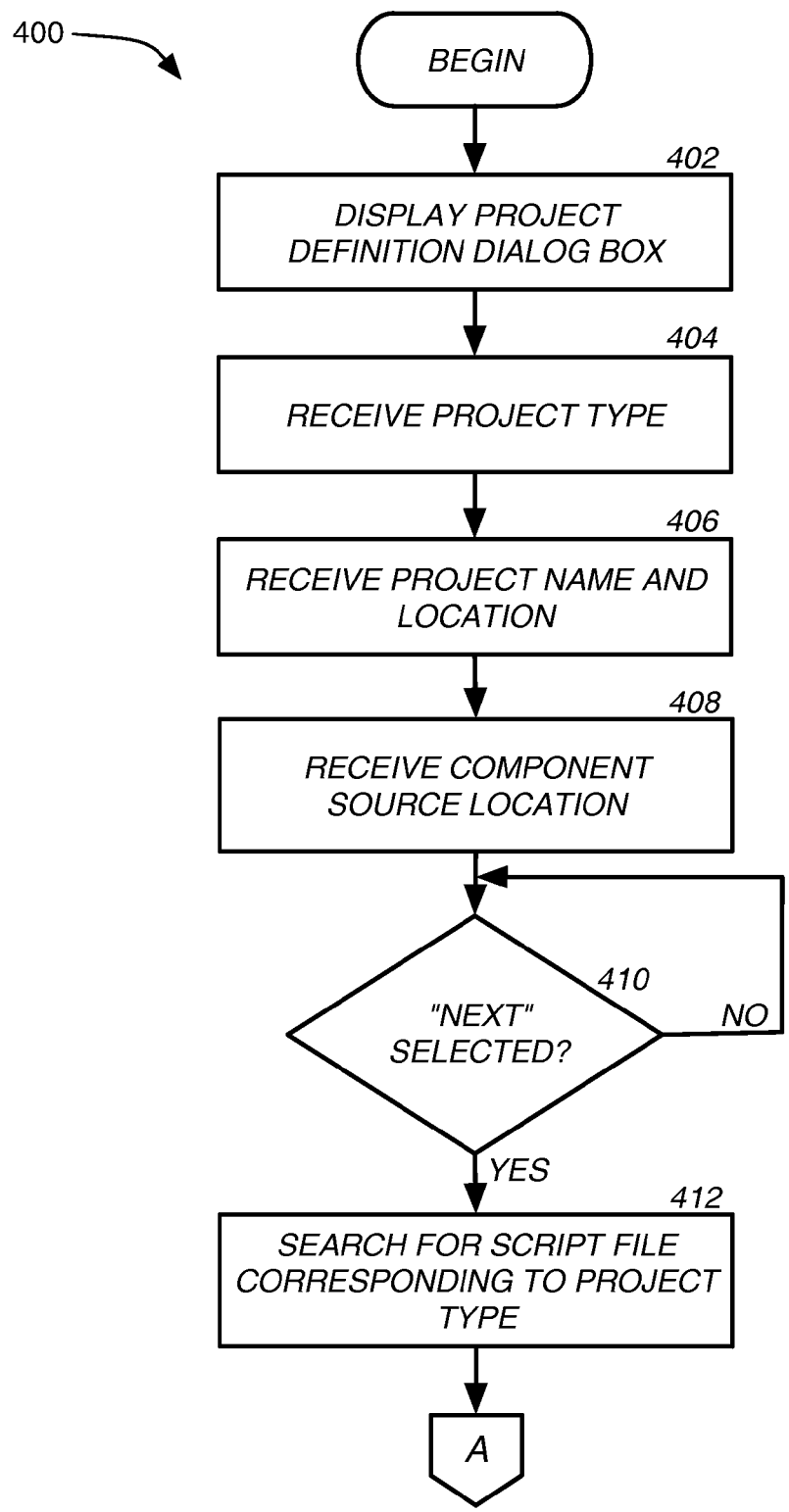
FIGS. 4A-4E are flow diagrams illustrating a method for creating a BIOS project according to one embodiment presented herein.
Figure 4B:
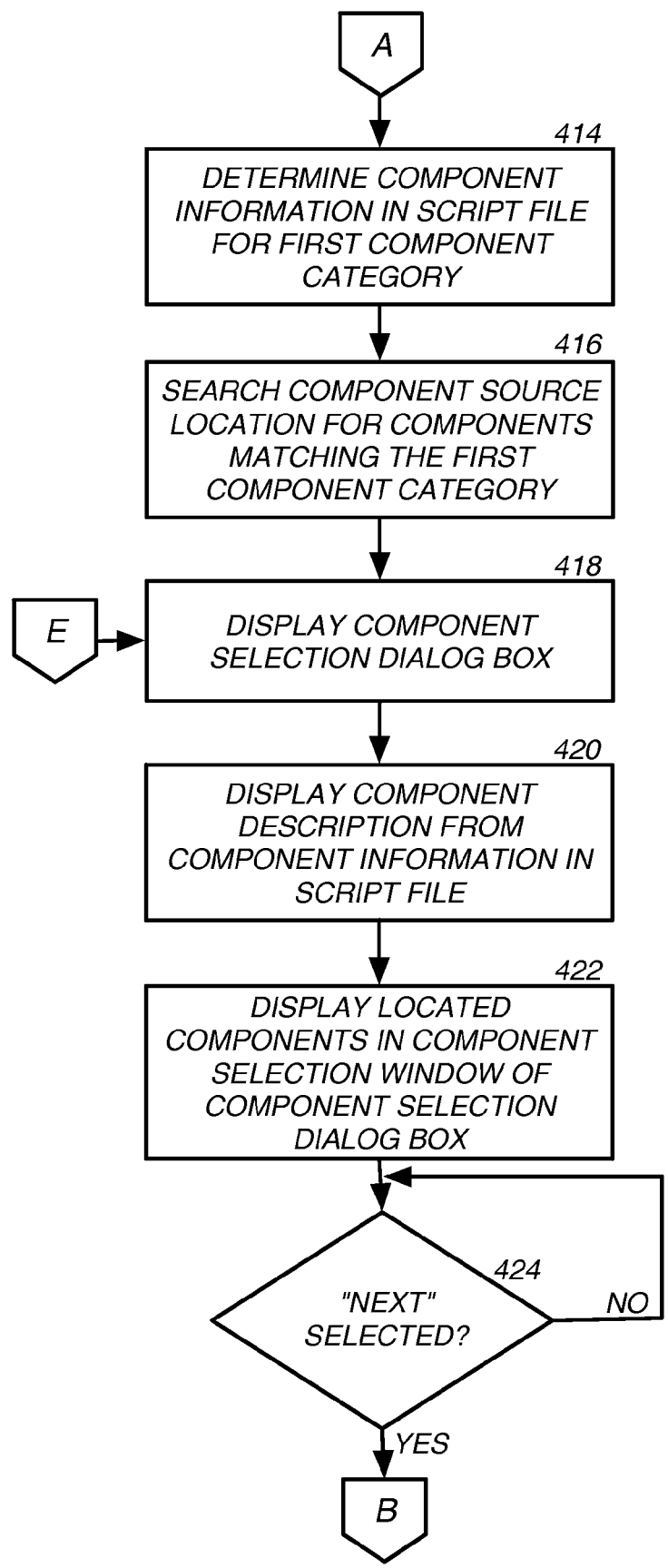
Figure 4C:
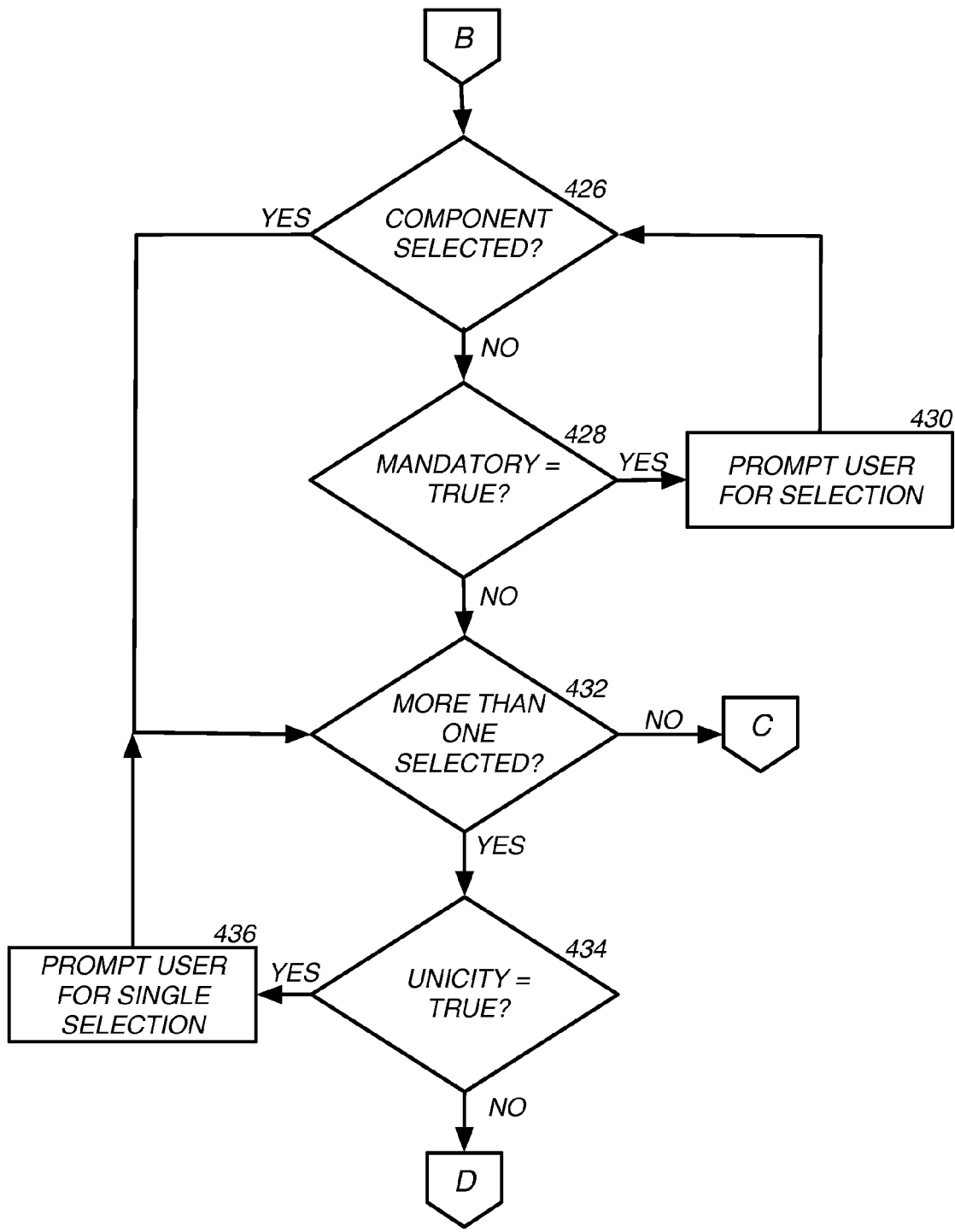
Figure 4D:
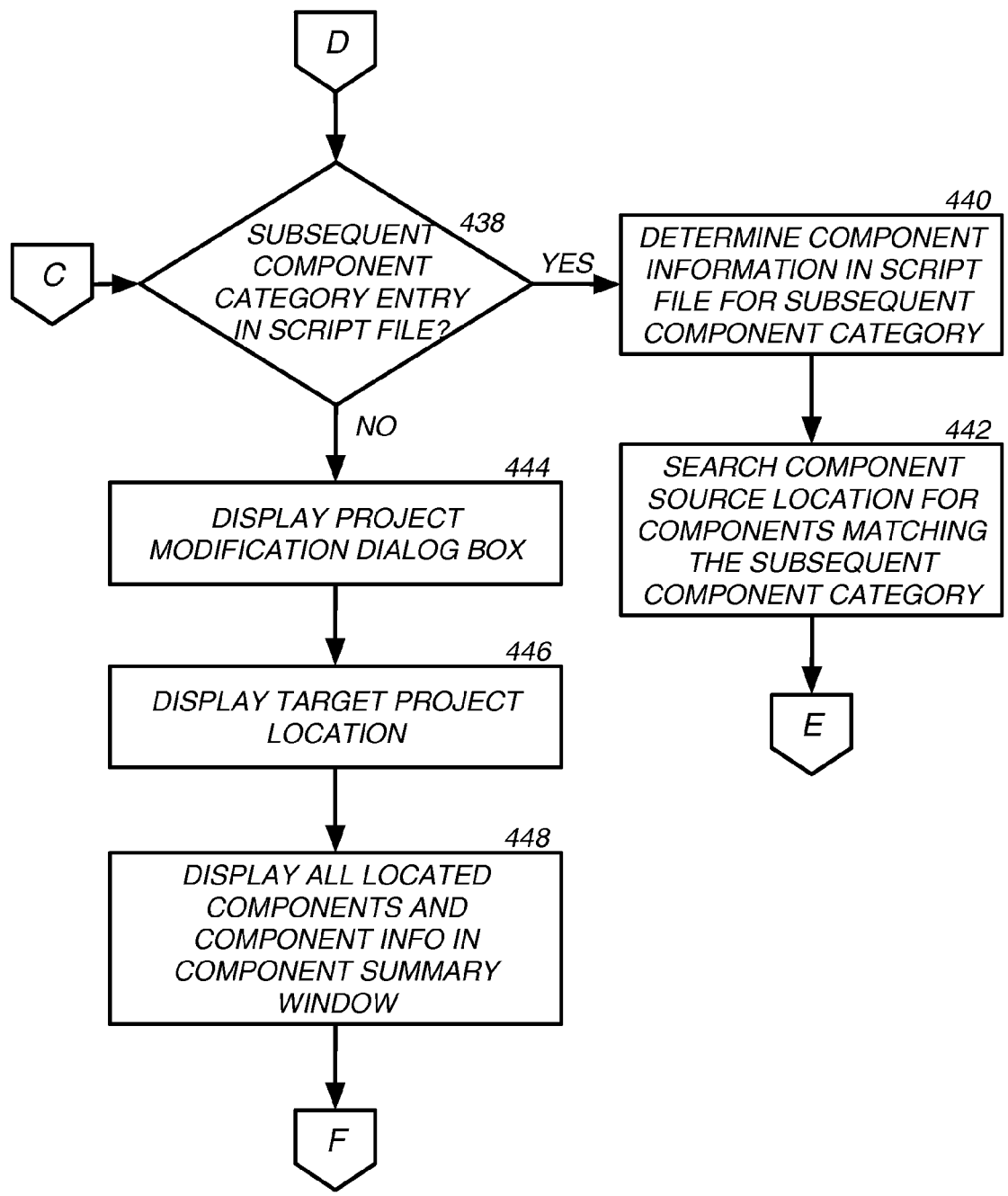
Figure 4E:
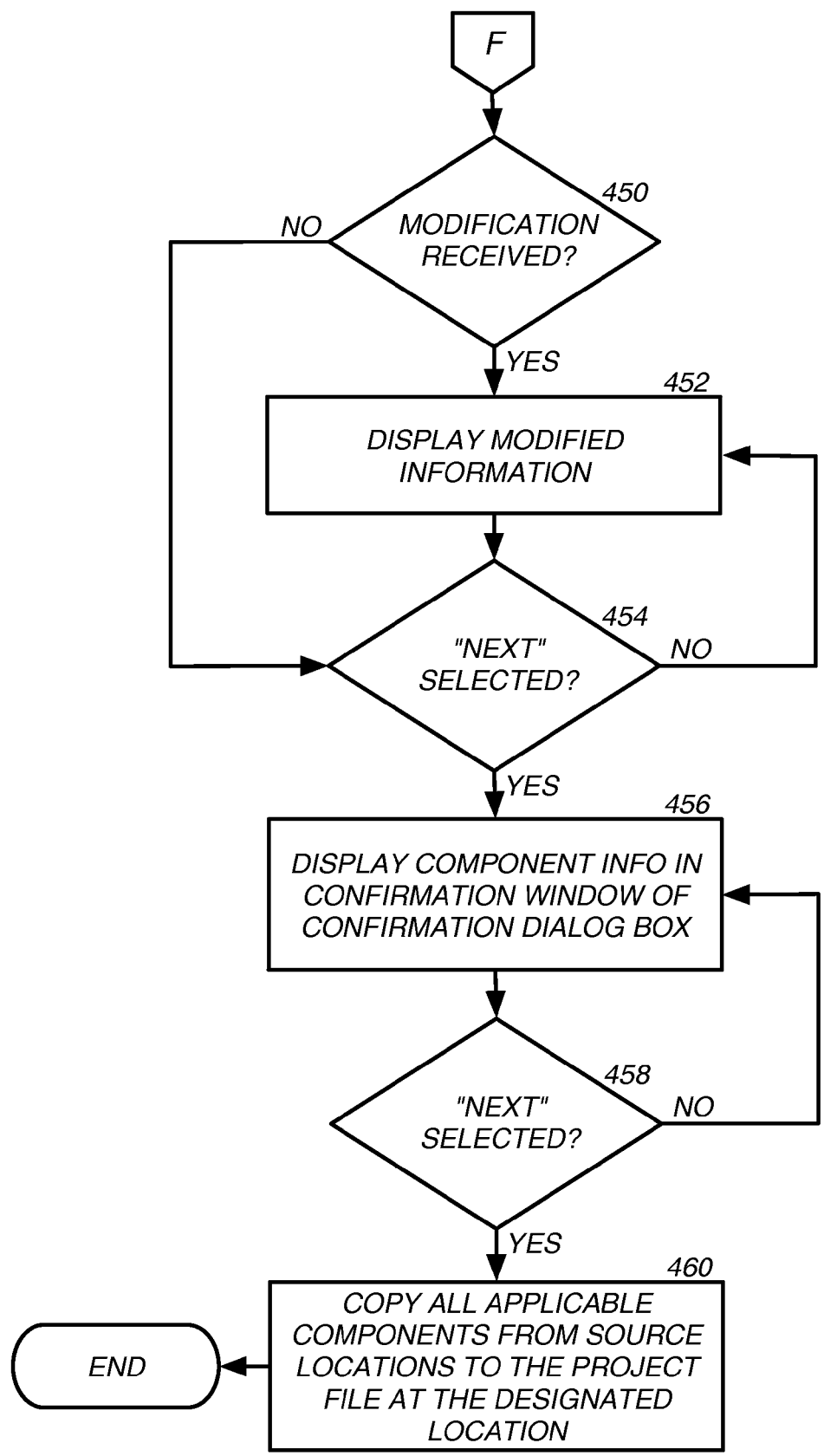

According to one implementation, once the "Next" button 362 is selected, then the project creation wizard 104 will display the confirmation dialog box 370 shown in FIG. 3D. The confirmation dialog box 370 provides a summary of the BIOS component information that will be incorporated into the BIOS project file 106 within the confirmation window 372. The summary information includes a component category identifier 374, a component identifier 376, a source path 378 corresponding to the location from which the BIOS component 108 will be copied, and a target project path 380 corresponding to the location within the BIOS project file 106 to which the BIOS component 108 will be copied. This information is provided for each BIOS component 108 to be included within the BIOS project file 106.

If any of this information is incorrect, then the user may select the "Back" button 384 to return to a previous dialog box to make a correction. The user may also use the "Cancel" button 386 to exit the project creation wizard 104, or the "Help" button 388 to receive additional assistance. Once the user has confirmed the contents of the BIOS project file 106 to be created, then the "Next" button 382 is selected and all of the corresponding BIOS components 108 are copied to the indicated locations to create the new BIOS project file 106.

It should be understood that the disclosure presented herein is not limited to the dialog boxes 302, 324, 348, and 370 shown in FIGS. 3A-3D. Any number of dialog boxes may be included as part of the project creation wizard user interface 300 and utilized by the project creation wizard 104 to guide a user through a BIOS component 108 selection process when building a BIOS project file 106. Similarly, the implementations described herein are not limited to the type and quantity of data input by the user into the project creation wizard user interface 300. The project creation wizard 104 may utilize pre-determined default values for any of the described user input or may omit any of the described dialog boxes to accelerate the time required to complete the project creation wizard 104 and arrive at the resulting BIOS project file 106.

Turning now to FIGS. 4A-4E, an illustrative routine 400 will be described for creating a BIOS project according to various embodiments presented herein. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance requirements of the computing system. Accordingly, the logical operations described herein are referred to variously as operations, structural devices, acts, or modules. These operations, structural devices, acts and modules may be implemented in software, in firmware, in special purpose digital logic, and any combination.

The routine 400 begins at operation 402, where the project creation wizard 104 displays the project definition dialog box 302. From operation 402, the routine 400 continues to operation 404, where the project creation wizard 104 receives a selection in the project selection field 314 of the project definition dialog box 302 corresponding to the type of BIOS project being created. The routine 400 continues from operation 404 to operation 406, where the project creation wizard 104 receives a project name and location path in the respective project name field 304 and the project location field 306 of the project definition dialog box 302. From operation 406, the routine 400 continues to operation 408, where the project creation wizard 104 receives a source location in the component library path field 310 corresponding to the location in which the project creation wizard 104 will search for applicable BIOS components 108.

The routine 400 continues to operation 410 from operation 408, where the project creation wizard 104 determines whether the "Next" button 316 has been selected. If not, the routine 400 waits for further input prior to proceeding. However, if at operation 410, the project creation wizard 104 receives a selection of the "Next" button 316, then the routine 400 proceeds to operation 412, where the project creation wizard 104 searches for a script file 114 corresponding to the selected type of project. The routine 400 continues from operation 412 to operation 414, where the project creation wizard 104 searches for the first component category entry 204 to collect the applicable component search and selection criteria. From operation 414, the routine 400 continues to operation 416, where the project creation wizard 104 searches the component source location that was input into the component library path field 310 for all BIOS components 108 having a category that matches the component category identifier 206 of the applicable component category entry 204.

From operation 416, the routine 400 continues to operation 418, where the project creation wizard 104 displays the component selection dialog box 324. The routine 400 continues to operation 420, where the project creation wizard 104 displays the component category description 208 from the applicable component category entry 204 of the script file 114 within the component selection dialog box 324. From operation 420, the routine 400 continues to operation 422, where the project creation wizard 104 displays all located BIOS components 108 matching the corresponding component category identifier 206 in the component selection window 328 of the component selection dialog box 324.

The routine 400 continues to operation 424 where the project creation wizard 104 determines whether the "Next" button 340 has been selected. If not, the routine 400 waits for further input prior to proceeding. However, if at operation 424, the project creation wizard 104 receives a selection of the "Next" button 340, then the routine 400 proceeds to operation 426, where the project creation wizard 104 determines whether a BIOS component 108 listed within the component selection window 328 has been selected. If a BIOS component 108 has been selected, then the routine proceeds to operation 432 and continues as described below. However, if at operation 426, the project creation wizard 104 determines that a BIOS component 108 has not been selected, then the routine 400 continues to operation 428, where the project creation wizard 104 determines whether the logical value corresponding to the "mandatory" indicator 212 of the applicable component category entry 204 is set to "true."

If the project creation wizard 104 determines that the applicable "mandatory" indicator 212 is set to "true," indicating that at least one BIOS component 108 from the searched component category must be included in the BIOS project file 106, then the project creation wizard 104 prompts the user for a selection of at least one BIOS component 108 at operation 430. From operation 430, the routine 400 returns to operation 426 and proceeds as described above. However, if at operation 428, the project creation wizard 104 determines that the applicable "mandatory" indicator 212 is not set to "true," then the routine 400 continues from operation 428 to operation 432, where the project creation wizard 104 determines whether more than one BIOS component 108 listed within the component selection window 328 has been selected. If it is determined that more than one BIOS component 108 listed within the component selection window 328 has not been selected, then the routine 400 proceeds to operation 438 and continues as described below. However, if at operation 432, the project creation wizard 104 determines that more then one BIOS component 108 listed within the component selection window 328 has been selected, then the routine 400 continues to operation 434.

At operation 434, the project creation wizard 104 determines whether the logical value corresponding to the "unicity" indicator 214 of the applicable component category entry 204 is set to "true." If the project creation wizard 104 determines that the applicable "unicity" indicator 214 is set to "true," indicating that no more than one BIOS component 108 from the searched component category may be included in the BIOS project file 106, then the project creation wizard 104 prompts the user for a selection of a single BIOS component 108 at operation 436. From operation 436, the routine 400 returns to operation 432 and proceeds as described above. However, if at operation 434, the project creation wizard 104 determines that the applicable "unicity" indicator 214 is not set to "true," then the routine 400 continues from operation 434 to operation 436, where the project creation wizard 104 determines whether there is a subsequent component category entry 204 within the script file 114.

If there is a subsequent component category entry 204 within the script file 114, then the routine 400 proceeds from operation 438 to operation 440, where the project creation wizard 104 collects the applicable component information in the script file 114 for the subsequent component category entry 204. From operation 440, the routine 400 continues to operation 442, where the project creation wizard 104 searches the designated component source location that was input into the component library path field 310 for all BIOS components 108 having a category that matches the component category identifier 206 of the subsequent component category entry 204. The routine 400 then returns to operation 418 and proceeds as described above until there are no additional component category entries 204 within the script file 114 that have not been used to search for applicable BIOS components 108.

For example, looking at FIG. 2, once the search and BIOS component selection process for the component category entry 204A is complete, the project creation wizard 104 will determine whether any subsequent component category entries exist. Finding the component category entry 204B, the project creation wizard 104 will collect the data stored in the component category entry 204B and begin the search and selection process again. The search and selection process will continue for each subsequent component category entry 204C-204F until all of the component category entries 204A-204F have been used to search for applicable BIOS components 108 in each of the corresponding component categories.

Returning now to operation 438, if the project creation wizard 104 determines that there are no subsequent component category entries 204 within the script file 114, then the routine 400 continues to operation 444, where the project creation wizard 104 displays the project modification dialog box 370. From operation 444, the routine 400 continues to operation 446, where the project creation wizard 104 displays the project location path 350 from the project location field 306 of the project definition dialog box 302 before proceeding to operation 448. At operation 448, the project creation wizard 104 displays all located BIOS components 108 and corresponding BIOS component information in the component summary window 360. The routine 400 continues from operation 448 to operation 450, where the project creation wizard 104 determines whether a modification to any of the BIOS components or the corresponding BIOS component information has been received. As described above, the project modification dialog box 348 provides a user with a final opportunity to deselect any undesirable BIOS components 108 or component parts, or to modify the component name 354, the component directory location 356, or the source path 358 prior to creating the BIOS project file 106.

If the project creation wizard 104 determines at operation 450 that modifications have not been received, then the routine 400 proceeds to operation 454 and continues as described below. However, if the project creation wizard 104 determines at operation 450 that modifications have been received, then the modifications are displayed for the user in the component summary window 360 at operation 452. The routine 400 continues from operation 452 to operation 454, where the project creation wizard 104 determines whether the "Next" button 362 has been selected. If not, the routine 400 returns to operation 452 and waits for further input prior to proceeding. However, if at operation 454, the project creation wizard 104 receives a selection of the "Next" button 362, then the routine 400 proceeds to operation 456, where the project creation wizard 104 displays all of the BIOS component information associated with the selected BIOS components 108 in the confirmation window 372 of the confirmation dialog box 370.

The confirmation dialog box 370 allows the user to view information corresponding to each BIOS component 108 to be included within the BIOS project file 106 prior to creating the BIOS project file 106. The routine 400 continues from operation 456 to operation 458, where the project creation wizard 104 determines whether the "Next" button 382 has been selected. If not, the routine 400 returns to operation 456 and waits for further input prior to proceeding. However, if at operation 458, the project creation wizard 104 receives a selection of the "Next" button 382, then the routine 400 proceeds to operation 460, where the project creation wizard 104 copies all of the applicable BIOS components 108 from their respective source locations to the designated project file locations to create the BIOS project file 106.

Figure 5:
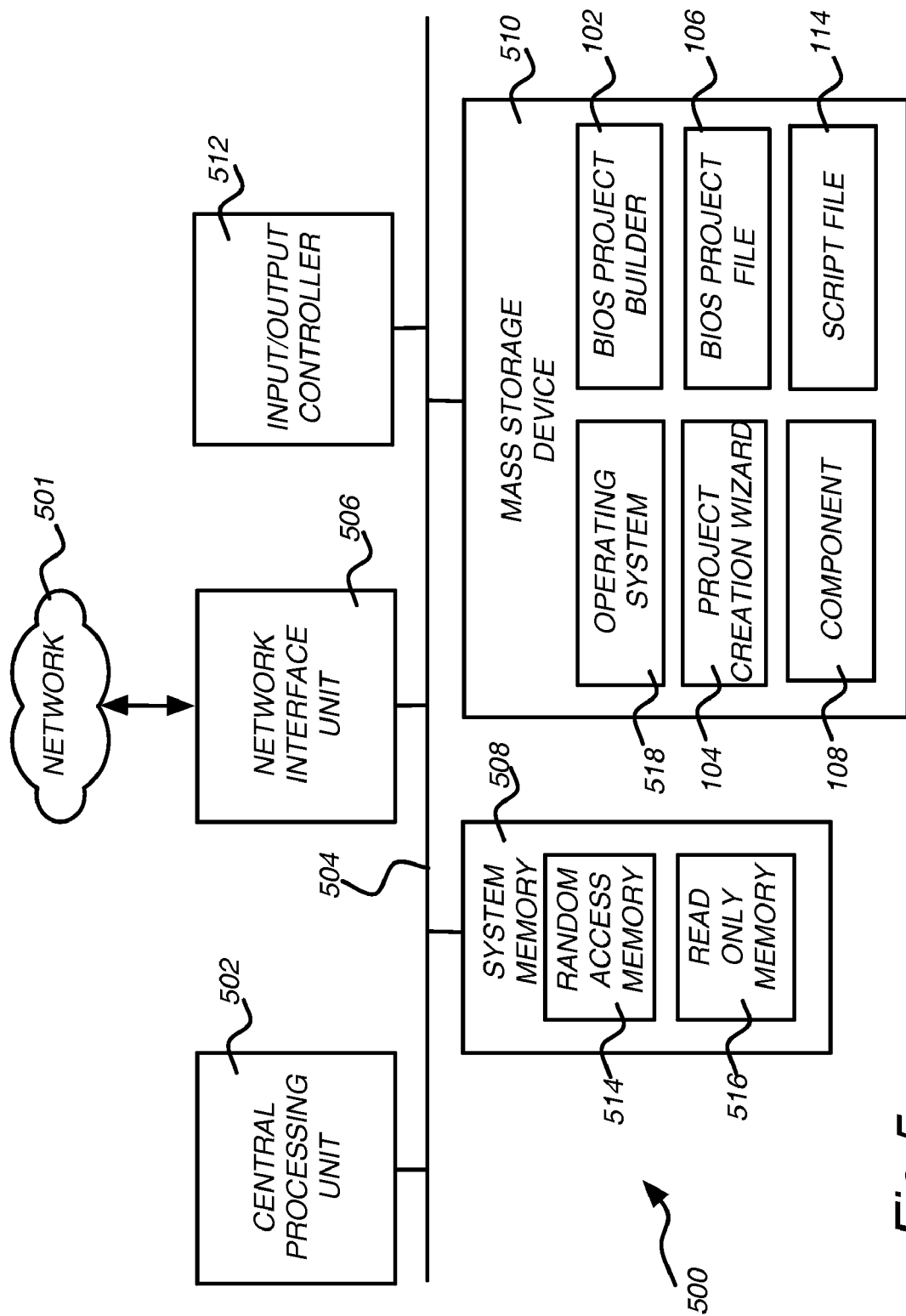
FIG. 5 is a computer architecture diagram showing a computer architecture suitable for implementing the various computer systems described herein.

Referring now to FIG. 5, an illustrative computer architecture for a computer 500 utilized in the various embodiments presented herein will be discussed. The computer architecture shown in FIG. 5 illustrates a conventional desktop, laptop computer, or server computer. The computer architecture shown in FIG. 5 includes a central processing unit 502 (CPU), a system memory 508, including a random access memory 514 (RAM) and a read-only memory (ROM) 516, and a system bus 504 that couples the memory to the CPU 502. A BIOS containing the basic routines that help to transfer information between elements within the computer 500, such as during startup, is stored in the ROM 516. The computer 500 further includes a mass storage device 510 for storing an operating system 518, application programs, and other program modules, which will be described in greater detail below.

The mass storage device 510 is connected to the CPU 502 through a mass storage controller (not shown) connected to the bus 504. The mass storage device 510 and its associated computer-readable media provide non-volatile storage for the computer 500. Although the description of computer-readable media contained herein refers to a mass storage device, such as a hard disk or CD-ROM drive, it should be appreciated by those skilled in the art that computer-readable media can be any available media that can be accessed by the computer 500.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer 500.

According to various embodiments, the computer 500 may operate in a networked environment using logical connections to remote computers through a network 501, such as the Internet. The computer 500 may connect to the network 501 through a network interface unit 506 connected to the bus 504. It should be appreciated that the network interface unit 506 may also be utilized to connect to other types of networks and remote computer systems. The computer 500 may also include an input/output controller 512 for receiving and processing input from a number of other devices, including a keyboard, mouse, or electronic stylus (not shown in FIG. 5). Similarly, an input/output controller may provide output to a display screen, a printer, or other type of output device (also not shown in FIG. 5).

As mentioned briefly above, a number of program modules and data files may be stored in the mass storage device 510 and RAM 514 of the computer 500, including an operating system 518 suitable for controlling the operation of a networked desktop or server computer, such as the WINDOWS XP or WINDOWS VISTA operating systems from MICROSOFT CORPORATION of Redmond, Wash. Other operating systems, such as the LINUX operating system or the OSX operating system from APPLE COMPUTER, INC. may be utilized. It should be appreciated that the implementations presented herein may be embodied using a desktop or laptop computer or any other computing devices or systems or combinations thereof.

The mass storage device 510 and RAM 514 may also store one or more program modules. In particular, the mass storage device 510 and the RAM 514 may store a BIOS project builder 102, a project creation wizard 104, a BIOS project file 106, one or more BIOS components 108, one or more script files 114, and the other program modules described above with respect to FIG. 1. Based on the foregoing, it should be appreciated that systems, methods, and computer-readable media for creating a BIOS component using a folder-based project template file are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method of creating a basic input/output system (BIOS) project file, comprising:
receiving a BIOS project type;
identifying a BIOS component category corresponding to the BIOS project type from a script file;
searching for BIOS components corresponding to the BIOS component category;
presenting any located BIOS components for selection;
receiving a selection corresponding to any number of presented BIOS components for inclusion within the BIOS project file;
determining whether the selection of any number of presented BIOS components is valid according to component category selection criteria stored within the script file;
if the selection is determined not to be valid, then requesting an alternative selection that is consistent with the component category selection criteria; and
if the selection is determined to be valid, then creating the BIOS project file utilizing selected BIOS components.

2. The method of claim 1, wherein the component category selection criteria comprises an indicator as to whether a BIOS component from the BIOS component category is required to be included in the BIOS project file.

3. The method of claim 1, wherein the component category selection criteria comprises an indicator as to whether more than one BIOS component from the BIOS component category may be included in the BIOS project file.

4. The method of claim 1, wherein the script file is an extensible markup language (XML) file.

5. The method of claim 1, further comprising:
receiving a BIOS project location; and
receiving a BIOS component source location,
wherein searching for BIOS components corresponding to the BIOS component category comprises searching the BIOS component source location for BIOS components corresponding to the BIOS component category, and
wherein creating the BIOS project file utilizing the selected BIOS components comprises copying the selected BIOS components from the component source location to the BIOS project location into the BIOS project file.

6. The method of claim 1, further comprising:
prior to creating the BIOS project file, identifying a new BIOS component category corresponding to the BIOS project type from the script file;
searching for new BIOS components corresponding to the new BIOS component category;
presenting any located new BIOS components for selection;
receiving a selection corresponding to any number of presented new BIOS components for inclusion within the BIOS project file;
determining whether the selection of any number of presented new BIOS components is valid according to new component category selection criteria corresponding to the new BIOS component category and stored within the script file;
if the selection is determined not to be valid, then requesting an alternative selection that is consistent with the new component category selection criteria; and
if the selection is determined to be valid, then creating the BIOS project file utilizing the selected BIOS components.

7. The method of claim 1, wherein the script file comprises a plurality of component category entries, wherein each component category entry is characterized by the BIOS component category, a component category description, a directory location within the BIOS project file for storing BIOS components within the component category, and the component category selection criteria.

8. A computer-readable medium having computer-executable instructions stored thereon which, when executed by a computer, cause the computer to:
display a user interface;
receive a selection via the user interface of a project type;
retrieve a script file corresponding to the project type;
search the script file for a component category;
search a component source location for all BIOS components matching the component category;
display any located BIOS components matching the component category via the user interface;
receive a selection of any number of displayed BIOS components to be included in the BIOS project file;
determine whether the selection of any number of displayed BIOS components is valid according to component category selection criteria stored within the script file;

if the selection is determined not to be valid, then to request an alternative selection that is consistent with the component category selection criteria; and if the selection is determined to be valid, then to copy selected BIOS components from the component source location to a BIOS project location to create the BIOS project file.

9. The computer-readable medium of claim 8, further comprising computer-executable instructions stored thereon which, when executed by a computer, cause the computer to disable a BIOS component from the BIOS project file according to a target computer system specification and create a read-only memory (ROM) image of the BIOS project file that excludes the disabled component.

10. The computer-readable medium of claim 8, wherein the component category selection criteria comprises a logical value corresponding to whether a BIOS component from the BIOS component category is required to be included in the BIOS project file.

11. The computer-readable medium of claim 8, wherein the component category selection criteria comprises a logical value corresponding to whether more than one BIOS component from the BIOS component category may be included in the BIOS project file.

12. The computer-readable medium of claim 8, wherein the user interface comprises a source control button, the selection of which instructs the computer to search a designated component database for all BIOS components matching the component category.

13. The computer-readable medium of claim 8, wherein the script file comprises a plurality of component category entries, wherein each component category entry is characterized by a component category, a component category description, a directory location within the BIOS project file for storing BIOS components within the component category, and the component category selection criteria.

14. A method of selecting BIOS components for inclusion within a BIOS project, comprising:
retrieving a script file corresponding to a project type;
searching the script file for a component category and component category selection criteria, wherein the component category selection criteria comprises a requirement indicator as to whether a BIOS component from the BIOS component category is required to be included in the BIOS project and a unicity indicator as to whether more than one BIOS component from the BIOS component category may be included in the BIOS project;
retrieving identifiers from a component storage medium of all BIOS components characterized by a component category matching the component category from the script file;
requesting user selection of any component identifiers corresponding to BIOS components to be included within the BIOS project;
receiving the user selection component identifiers according to the component category selection criteria; and
identifying the BIOS components corresponding to the user selection as BIOS project components.

15. The method of claim 14, further comprising:
prior to identifying the BIOS components corresponding to the user selection as BIOS project components, displaying the user selection of component identifiers in a dialog box;
displaying with each component identifier a directory location within the BIOS project file for storing a corresponding BIOS component and a source location of the BIOS component within the component storage medium; and
providing means for deselecting BIOS components from being included in the BIOS project and for modifying project and source locations corresponding to each component identifier.

16. The method of claim 14, wherein the script file comprises a plurality of component category entries, wherein each component category entry is characterized by a component category, a component category description, a directory location within the BIOS project for storing BIOS components within the component category, and the component category selection criteria.

17. The method of claim 14, further comprising:
copying the identified BIOS components from the component storage medium to a BIOS project location to create the BIOS project.

18. The method of claim 14, wherein the script file is an XML file.

* * * * *